United States Patent
Ohno et al.

(10) Patent No.: US 7,490,690 B2
(45) Date of Patent: Feb. 17, 2009

(54) CONTROL DEVICE FOR FRONT-AND-REAR WHEEL DRIVE VEHICLE

(75) Inventors: Akihiro Ohno, Okazaki (JP); Yasushi Yamada, Okazaki (JP)

(73) Assignee: JTEKT Corporation, Osaka (JP)

( * ) Notice: Subject to any disclaimer, the term of this patent is extended or adjusted under 35 U.S.C. 154(b) by 218 days.

(21) Appl. No.: 10/828,277

(22) Filed: Apr. 21, 2004

(65) Prior Publication Data

US 2004/0211611 A1 Oct. 28, 2004

(30) Foreign Application Priority Data

Apr. 28, 2003 (JP) ............................. 2003-123080

(51) Int. Cl.
*B60K 17/344* (2006.01)
(52) U.S. Cl. ...................... 180/247; 180/233
(58) Field of Classification Search ................ 180/233, 180/247, 248–250; 477/174; 701/69
See application file for complete search history.

(56) References Cited

U.S. PATENT DOCUMENTS

| | | | |
|---|---|---|---|
| 4,805,715 A * | 2/1989 | Deike et al. ................. | 180/197 |
| 5,813,490 A | 9/1998 | Takasaki et al. | |
| 5,819,194 A | 10/1998 | Hara et al. | |
| 6,450,921 B1 | 9/2002 | Glab et al. | |
| 6,645,108 B1 * | 11/2003 | Gradu ......................... | 475/151 |
| 2003/0045393 A1 | 3/2003 | Yoshioka et al. | |

FOREIGN PATENT DOCUMENTS

| | | |
|---|---|---|
| EP | 0 278 588 A1 | 8/1988 |
| EP | 1 188 596 A2 | 3/2002 |
| JP | 2001-82571 | 3/2001 |

* cited by examiner

*Primary Examiner*—Anne Marie Boehler
(74) *Attorney, Agent, or Firm*—Oblon, Spivak, McClelland, Maier & Neustadt, P.C.

(57) ABSTRACT

A control device is provided for electrically controlling a drive power transmission device arranged on a driving power transmission path of a front-and rear wheel drive vehicle thereby to switch the drive mode of the vehicle selectively to either of a two-wheel drive mode and a four-wheel drive mode. The control device inhibits the drive mode from being switched to that commanded to be switched to when the vehicle is traveling at a slower speed than a predetermined speed and when the rotational speed difference between front and rear wheels is larger than a predetermined value. Further, the control device gradually decreases a present torque which the driving power transmission device is transmitting before the switching of the drive mode, to a target torque which the drive power transmission device is to transmit after the switching of the drive mode, when the difference between the present and target torques is more than another predetermined valve at the time of the switching of the drive mode. Thus, the driving power transmission path can be prevented from generating the drive torque beyond a tolerable valve as well as making a noise due to the instantaneous switching of the drive mode during the traveling of the vehicle, and the vehicle can be prevented from abruptly changing its motion by the cause of the instantaneous drive mode switching.

6 Claims, 7 Drawing Sheets

CONTROL DEVICE FOR FRONT-AND-REAR WHEEL DRIVE VEHICLE

INCORPORATION BY REFERENCE

This application is based on and claims priority under 35 U.S.C. sctn. 119 with respect to Japanese Application No. 2003-123080, the entire content of which is incorporated herein by reference.

BACKGROUND OF THE INVENTION

1. Field of the Invention

The present invention relates to a control device for controllably switching the drive mode of a front-and-rear wheel drive vehicle to a drive mode commanded to be switched to by electrically controlling a drive power transmission device installed on the front-and-rear wheel drive vehicle.

2. Discussion of the Related Art

Heretofore, as described in Japanese unexamined, published patent application No. 2001-82571, there have been known a front-and-rear wheel drive vehicle of the type having a driving power transmission device on a driving power transmission path for transmitting the driving power from a driving power source to driven wheels such as, for example, rear wheels. The driving power transmission device installed on the front-and-rear wheel drive vehicle is provided in the driving power transmission path extending from the primary driven wheels to the secondary driven wheels and operates to transmit the driving power to the secondary driven wheels. The driving power transmission device may otherwise be installed inside of a center differential which distributes the driving power to both pairs of driven wheels and operates as a limited slip differential.

The aforementioned front-and-rear wheel drive vehicle is provided with a control device for electrically controlling the driving power transmission device. The control device is capable of selectively switching the drive mode of the vehicle to either of various driving modes by electrically controlling the driving power transmission device. With such a control device, the drive mode of the vehicle can be controllably switched to, for example, two-wheel drive mode, automatic four-wheel drive mode, four-wheel drive lock mode, or the like.

However, the aforementioned control device in the prior art takes the construction that when a driver or the like applies a switching command signal to the control device to switch the drive mode from the present one to a desired one, the switching to the commanded drive mode is effected instantaneously regardless of the state of the vehicle at that moment. Thus, it may be the case that in dependence on the state of the vehicle at the time of such a switching command given, an excessive driving force (i.e., torque) may be transmitted instantaneously to the driven wheels. This undesirably results in the occurrence of a torque exceeding an allowable level, the generation of an abnormal sound or noise, the abrupt change in the vehicle motion or the like.

For example, while the vehicle traveling at a low speed in the two-wheel drive mode is suffering a large slip, the switching to the four-wheel drive mode may cause the torque to be transmitted to the secondary driven wheels abruptly. This may make a cause to the generation of a torque exceeding the allowable level or an abnormal sound. Furthermore, when the torque is changed abruptly by the instantaneous switching of the drive mode during the vehicle traveling, the motion of the vehicle suddenly changes, especially where the vehicle is making a turn.

SUMMARY OF THE INVENTION

Accordingly, it is a primary object of the present invention is to provide an improved control device which is capable of properly performing the switching control of the drive mode in dependence on the state of a front-and-rear wheel drive vehicle at the time of the switching of the drive mode and thereby, of solving the foregoing problems arising when the switching to a commanded drive mode is made instantaneously.

Briefly, according to a first aspect of the present invention, there is provided a control device for a front-and-rear drive vehicle for electrically controlling a driving power transmission device which is arranged on a driving power transmission path of the vehicle for transmitting the driving power from a power source to driven wheels as either of front wheels and rear wheels of the vehicle. The control device includes switching control means for electrically controlling the driving power transmission device to switch the drive mode of the vehicle selectively to a two-wheel drive mode or a four-wheel drive mode. The control device further includes switching inhibiting means for inhibiting the drive mode of the vehicle from being switched to a commanded one of the drive modes when the vehicle is traveling at a lower speed than a predetermined value and when the rotational speed difference between the front and rear wheels is larger than a predetermined difference.

With this construction, the drive mode of the vehicle is inhibited from being switched from the present mode to the commanded mode when the vehicle is traveling at a lower speed than the predetermined value and when the rotational speed difference between the front and rear wheels is larger than the predetermined difference. Thus, for example, where the vehicle is traveling in the two-wheel drive mode while suffering a large slip, the instantaneous switching to the four-wheel drive mode which is being commanded to be switched to is inhibited, and the switching to the commanded four-wheel drive mode is delayed until the vehicle is relieved of suffering the large slip in the two-wheel drive mode. Accordingly, the driving power transmission path of the vehicle can be prevented from generating the torque beyond a tolerable valve and from making a noise.

In another or second aspect of the present invention, there is provided a control device for a front-and-rear drive vehicle for electrically controlling a driving power transmission device which is arranged on a driving power transmission path of the vehicle for transmitting the driving power from a power source to driven wheels as either of front wheels and rear wheels of the vehicle. The control device includes switching control means for electrically controlling the driving power transmission device to switch the drive mode of the vehicle selectively to a two-wheel drive mode or a four-wheel drive mode. The control device further includes gradual switching control means for electrically controlling the driving power transmission device to gradually decrease a present torque which the driving power transmission device is transmitting before the switching of the drive mode, to a target torque which the drive power transmission device is to transmit after the switching of the drive mode, when the difference between the present and target torques is more than a predetermined valve at the time of the switching of the drive mode.

According to the control device in the second aspect of the present invention, the driving torque of the vehicle at the time of the drive mode switching is not transmitted instantaneously to the driven wheels, whereby the driving power to the driven wheels is prevented from being abruptly changed due to the instantaneous switching of the drive mode during the traveling of the vehicle. Thus, the sudden change in the vehicle motion can be avoided while the vehicle is making a turn, for example.

In a further or third aspect of the present invention, a control device for a front-and-rear drive vehicle is provided for electrically controlling a driving power transmission device which is arranged on a driving power transmission path of the vehicle for transmitting the drive power from a power source to driven wheels as either of front wheels and rear wheels of the vehicle. The control device includes switching control means for electrically controlling the driving power transmission device to switch the drive mode of the vehicle selectively to a two-wheel drive mode or a four-wheel drive mode; and switching inhibiting means for inhibiting the drive mode of the vehicle from being switched to a commanded one of the drive modes when the vehicle is traveling at a lower speed than a predetermined value and when the rotational speed difference between the front and rear wheels is larger than a predetermined difference. The control device further includes gradual switching control means for electrically controlling the driving power transmission device to gradually decrease a present torque which the driving power transmission device is transmitting before the switching of the drive mode, to a target torque which the drive power transmission device is to transmit after the switching of the drive mode, when the difference between the present and target torques is more than a predetermined valve at the time of the switching of the drive mode.

According to the control device in the third aspect of the present invention, the switching inhibiting means and the gradual switching control means respectively perform the same functions as those in the aforementioned first and second aspects of present invention. Therefore, the control device in the third aspect of the present invention can attain those advantages accomplished not only in the first aspect but also in the second aspect of the present invention.

BRIEF DESCRIPTION OF THE ACCOMPANYING DRAWINGS

The forgoing and other objects and many of the attendant advantages of the present invention may readily be appreciated as the same becomes better understood by reference to a preferred embodiment of the present invention when considered in connection with the accompanying drawings, wherein like reference numerals designate the same or corresponding parts throughout several views, and in which.

DETAILED DESCRIPTION OF THE PREFERRED EMBODIMENT

Figure 1:
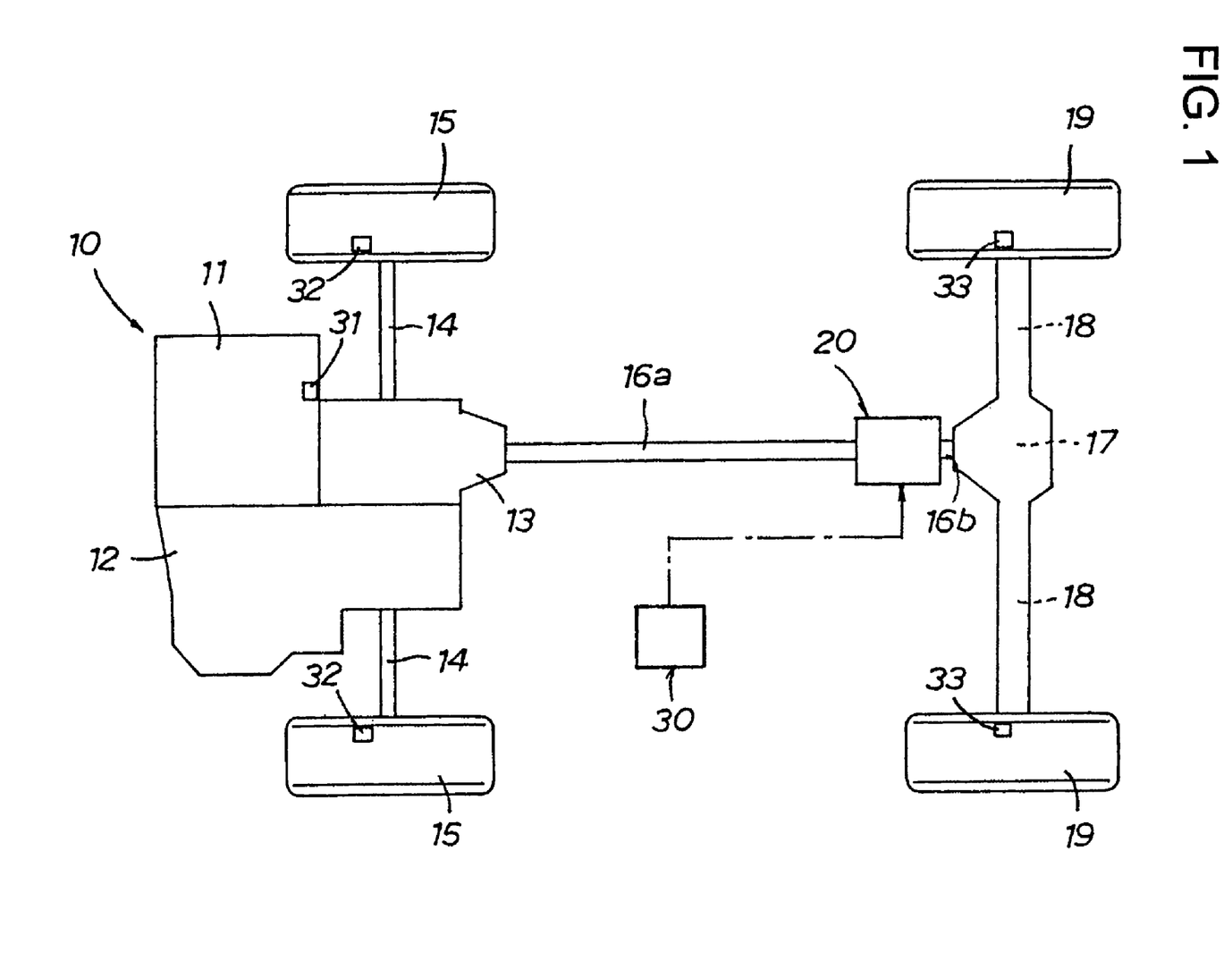
FIG. 1 is a schematic view of a front-and-rear wheel drive vehicle incorporating a control device in one embodiment according to the present invention and a driving power transmission device controllable by the control device.
Figure 2:
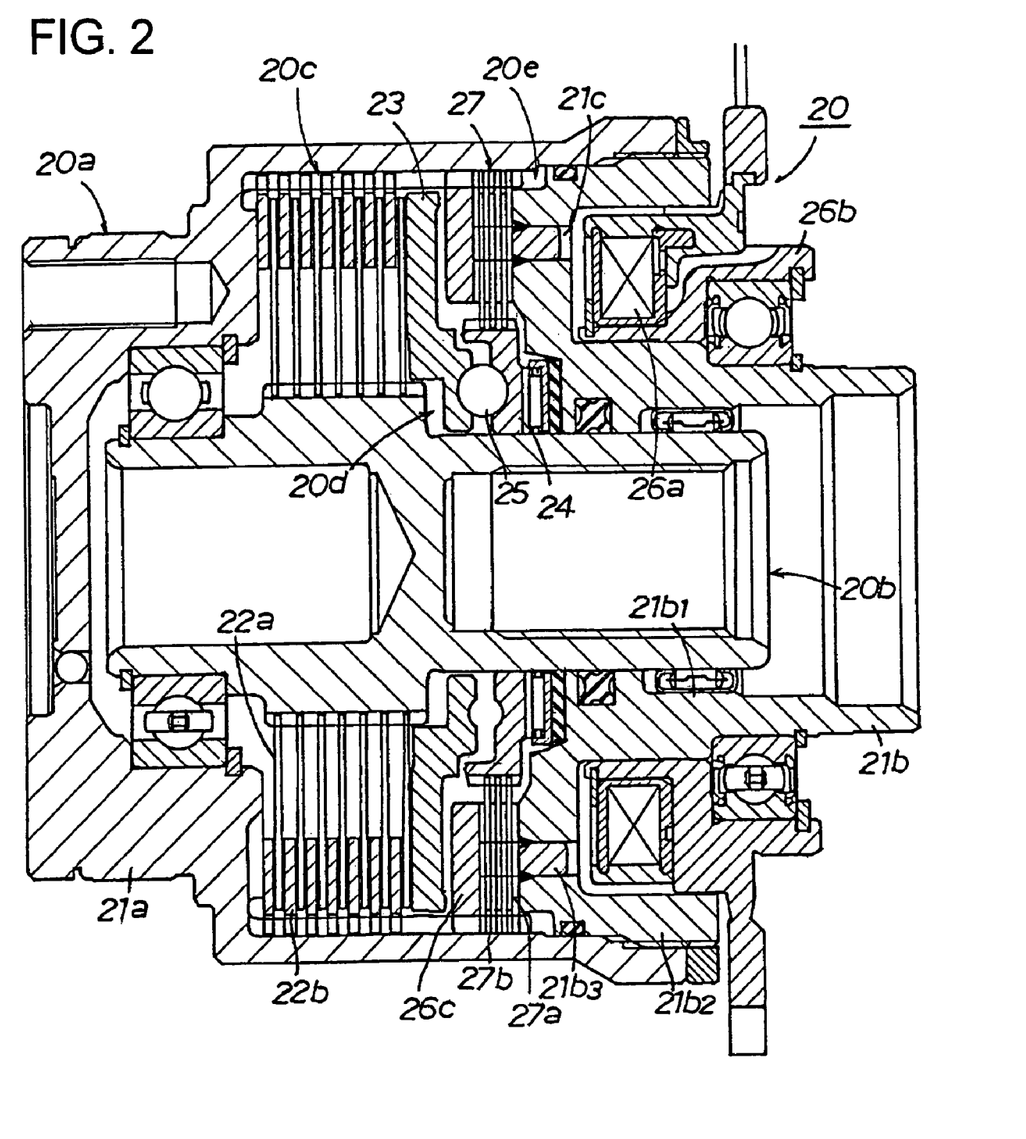
FIG. 2 is a sectional view of the driving power transmission device.
Figure 3:
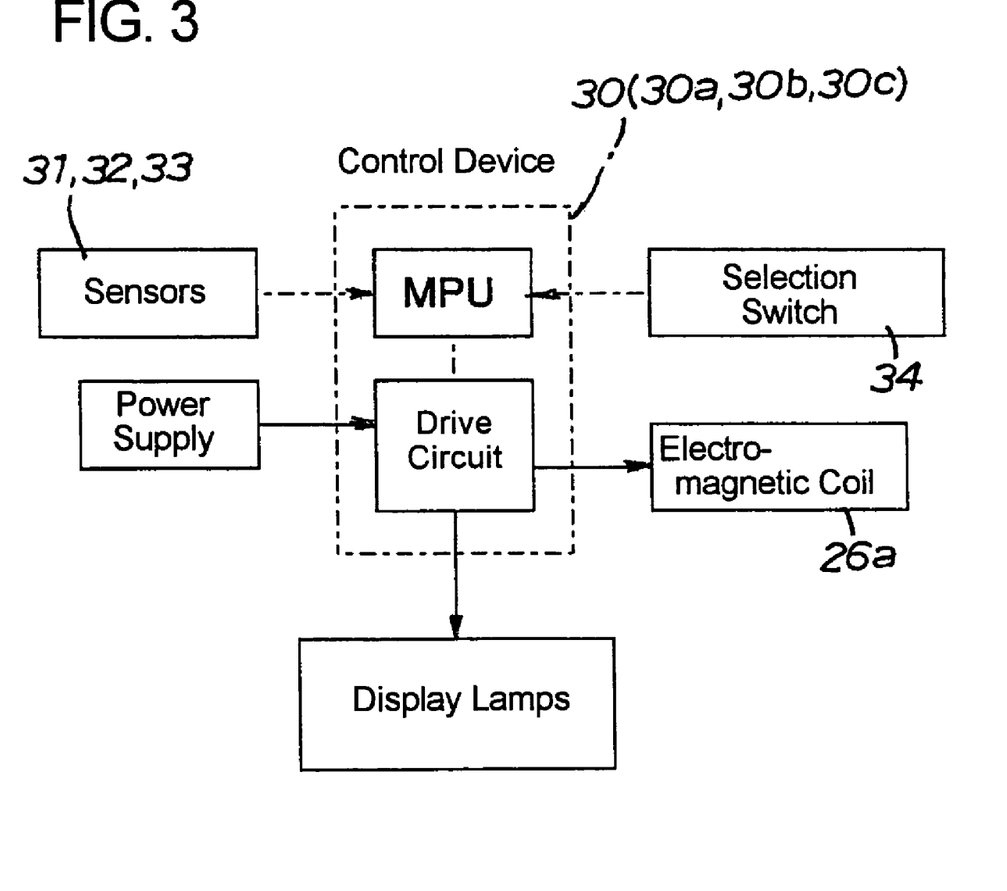
FIG. 3 is a block diagram showing the schematic construction of the control device.

The present invention relates to a control device for electrically controlling a driving power transmission device 20 installed on a front-and-rear wheel drive vehicle 10. FIG. 1 schematically shows the front-and-rear wheel drive vehicle 10. FIG. 2 shows the driving power transmission device 20. FIG. 3 shows a control device 30 for controlling the driving power transmission device 20.

The front-and-rear wheel drive vehicle 10 is of the type having front wheels 15 as primary driven wheels and rear wheels 19 as secondary driven wheels. The vehicle has a driving power transmission path for transmitting the driving power from an engine 11 to rear wheels 19. The driving power transmission device 20 is arranged on the driving power transmission path.

In the front-and-rear wheel drive vehicle 10, the driving power generated in the engine 11 is transmitted to axle shafts 14 at the front wheel side through a transmission 12 and a center differential 13 for driving the front wheels 15 and is also transmitted to a first propeller shaft 16a which constitutes the driving power transmission path.

In this configuration, when the driving power transmission device 20 is being driven by the control device 30 to keep the first propeller shaft 16a in driving connection to a second propeller shaft. 16b, the driving power of the first propeller shaft 16a is transmitted to the second propeller shaft 16b. The driving force transmitted to the second propeller shaft 16b is transmitted to rear wheel axle shafts 18 through a rear differential 17 to drive the rear wheels 19.

The driving power transmission device 20 is a known driving power transmission device incorporating an electromagnetic pilot drive mechanism therein. As shown in FIG. 2, the driving power transmission device 20 is composed of an outer case 20a as outer rotational member, an inner shaft 20b as inner rotational member, a main clutch mechanism 20c, a cam mechanism 20d and a pilot clutch mechanism 20e.

The outer case 20a constituting the driving power transmission device 20 comprises a front housing 21a with a bottom wall portion at one end and an opening portion at the other end and a rear housing 21b fluid-tightly closing the other end opening portion of the front housing 21a. The rear housing 21b is securely screwed into the other end opening portion of the front housing 21a to cover the other end opening portion.

The front housing 21a is made of a non-magnetic material (e.g., stainless steel), and the first propeller shaft 16a is connected to the front face of the bottom wall of the front housing 21a for torque transmission. The rear housing 21b is composed of inner and outer cylindrical portions 21b1 and 21b2 made of a magnetic material (e.g., iron) and an intermediate cylindrical portion 21b3 made of a non-magnetic material (e.g., stainless steel) fixed by welding, for example, between the both cylindrical portions 21b1 and 21b2.

The inner shaft 20b is coaxially inserted into the front housing 21a and fluid-tightly pierces through the central portion of the rear housing 21b. The inner shaft 20b is rotatably supported by the front housing 21a and the rear housing 21b with the axial movement thereof inhibited. The main clutch mechanism 20c, the cam mechanism 20d and the pilot clutch mechanism 20e are arranged between the outer surface of the inner shaft 20b and the internal surface of the outer case 20a. One end portion of the second propeller shaft 16b is inserted into the rear end portion of the inner shaft 20b to be drivingly connected to the inner shaft 20b.

The main clutch mechanism 20c is a wet-type, multiple-plate friction clutch having a plurality of clutch plates (inner clutch plates 22a and outer clutch plates 22b) and is arranged close to the bottom wall portion between the internal surface of the front housing 21a and the outer surface of the inner shaft 20b in the front housing 21a. Each inner clutch plate 22a constituting the friction clutch is spline-engaged with an outer spline on the outer surface of the inner shaft 20b to be axially slidable relative to the same. In addition, each outer clutch plate 22b is spline-engaged with an inner spline on the internal surface of the front housing 21a to be axially slidable relative to the same. Each of the inner clutch plates 22a and each of the outer clutch plates 22b are arranged in an alternate fashion and are brought into friction engagement when coming into contact with each other or out of friction engagement when going away from each other.

The cam mechanism 20d is arranged close to the other end of the main clutch mechanism 20c between the internal surface of the front housing 21a and the outer surface of the inner shaft 20b. The cam mechanism 20d is composed of a first cam member 23, a second cam member 24 and a plurality of cam followers 25. The first cam member 23 is spline-engaged with the outer spline on the outer surface of the inner shaft 20b to be axially movable relative to the same and is held to closely face one at the other end of the inner clutch plates 22a constituting the main clutch mechanism 20c. The second cam member 24 is smaller in diameter than the first cam member 23 and has an outer spline on the outer surface thereof. The second cam member 24 is supported on the outer surface of the inner shaft 20b rotatably relative to the same. Each of the cam followers 25 takes a ball-like shape and is held engaged with mating ball grooves formed on the confrontation surfaces of the cam members 23 and 24.

The pilot clutch mechanism 20e is an electromagnetic friction clutch composed of an electromagnet 26a, a yoke 26b, an armature 26c and a friction clutch 27. The electromagnet 26a takes a ring shape and is received in an annular hollow portion 21c of the rear housing 21 with itself being secured to the yoke 26b. The yoke 26b is supported on the rear housing 21b with a small clearance relative thereto to be rotatable relative to the rear housing 21b. In the pilot clutch mechanism 20e of the construction mentioned above, the rear housing 21b functions as a supporting member for supporting the yoke 26b with the electromagnet 26a fixed thereon and also functions as a magnetic path forming member.

The friction clutch 27 is a wet-type, multiple-plate friction clutch composed of several inner clutch plates 27a and several outer clutch plates 27b. The inner clutch plates 27a are spline-engaged with an outer spline on the outer surface of the second cam member 24 constituting the cam mechanism 20d and are axially movable relative to the second cam member 24. Each of the outer clutch plates 27b is spline-engaged with the inner spline on the internal surface of the front housing 21a and is axially movable relative to the front housing 21a. The armature 26c takes a ring shape and is spline-engaged with the inner spline on the internal surface of the front housing 21a to be axially movable relative to the front housing 21a. The armature 26c is positioned at the front side of the friction clutch 27 closely thereto.

In the driving power transmission device 20 as constructed above, the magnetic path is not formed and the friction clutch 27 is not engaged while an electric current is not applied to an electromagnetic coil of the electromagnet 26a constituting the pilot clutch mechanism 20e. In this state, the pilot clutch mechanism 20e is not active, and in the cam mechanism 20d, the second cam member 24 is rotatable bodily with the first cam member 23 through the cam follower 25 to keep the main clutch mechanism 20c out of engagement. Thus, the vehicle 10 is put in the two-wheel drive mode.

On the other hand, when an electric current is supplied to the electromagnetic coil of the electromagnet 26a, a magnetic path having a starting point at the electromagnet 26a and circulating through the yoke 26b, the rear cover 21b, the friction clutch 27 and the armature 26c is formed in the pilot clutch mechanism 20e, and the electromagnet 26a attracts the armature 26c. Thus, the armature 26c is pressured on the friction clutch 27 to bring the same into friction engagement. As a result, pilot torque is generated in the pilot clutch mechanism 20e, and relative rotation takes place between the first cam member 23 and the second cam member 24 thereby to pressure the first cam member 23 on the main clutch mechanism 20c by the action of the cam followers 25 against the ball grooves.

Consequently, the main clutch mechanism 20c is frictionally engaged in proportion to the friction force exerted on the friction clutch 27, and the torque depending on such friction is transmitted between the outer case 20a and the inner shaft 20b. Thus, the vehicle 10 is placed in the four-wheel drive mode wherein the first propeller shaft 16a and the second propeller shaft 16b are in an intermediate state between an uncoupled state and a directly coupled state.

In the four-wheel-drive mode, the control device 30 automatically controls the driving power distribution ratio within the range of 100:0 (two-wheel drive state) to 50:50 (direct coupling state). In the four-wheel-drive vehicle 10, the four-wheel drive mode is referred to as automatic mode in the four-wheel drive (i.e., automatic four-wheel drive mode).

Further, when the electric current to the electromagnet 26a is increased to a predetermined level, the attraction force of the electromagnet 26a to the armature 26c is increased, and the armature 26c is strongly attracted to gain the friction-engagement force of the friction clutch 27. This results in greater relative movement between the first cam member 23 and the second cam member 24.

Therefore, the pressuring force of the first cam member 23 on the main clutch mechanism 20c is further strengthened to bring the main clutch mechanism 20c into the directly coupled state. Thus, the vehicle is placed in the four-wheel drive mode wherein the first propeller shaft 16a and the second propeller shaft 16b are directly coupled. In the front-and-rear wheel drive vehicle 10, the four-wheel drive mode in this state is referred to as lock mode in the four-wheel drive (i.e., four-wheel drive lock mode) and also referred to otherwise as sports four-wheel drive mode.

The front-and-rear wheel drive vehicle 10 is constructed so that the driver can arbitrarily select either of the two-wheel drive mode, the automatic four-wheel drive mode and the four-wheel drive lock mode. In the front-and-rear wheel drive vehicle 10, a selection switch 34 is arranged beside the driver's seat, and the switching by the driver of the selection switch 34 enables a switching command signal to be output to the control device 30. In dependence on the switching command signal, the control device 30 controls the electric current to the electromagnetic coil of the pilot clutch mechanism 20e constituting the driving power transmission device 20, whereby the drive mode of the vehicle 10 is switched to a selected one of the drive modes.

It is to be noted that when the drive mode of the vehicle 10 is switched to the automatic four-wheel-drive mode, the control device 30 automatically controls the vehicle 10 to place the same in a four-wheel drive state suitable to the present driving status based on the detected signals from a throttle sensor 31, front-wheel speed sensors 32, rear-wheel speed sensors 33 and so on which are arranged on the vehicle 10, as shown in FIG. 1.

Referring now to FIG. 3, the control device 30 is provided including an MPU (microprocessor) and a drive circuit. The MPU incorporates a CPU and a memory (both not shown) therein, and the memory has stored therein control programs and various data for controlling the operation of the driving power transmission device 20. The control device 30 takes thereinto the detection signals from the throttle sensor 31, the front-wheel speed sensors 32, the rear-wheel speed sensors 33 and the like as well as the switching command signal from the selection switch 34 operated by the driver, through an interface (not shown).

Based on the switching command signal taken thereinto, the MPU outputs a command signal for instructing the vehicle 10 to be placed in a drive mode as commanded, to a drive circuit (not numbered) through the interface. In response to the output command signal, the drive circuit controls the electric current to the electromagnetic coil of the pilot clutch mechanism 20e thereby to switch the drive mode of the vehicle 10 to the selected drive mode. Furthermore, based on the various detection signals take thereinto, the MPU outputs a command signal for automatically controlling the four-wheel drive status of the vehicle 10, to the drive circuit through the interface. In response to the output command signal, the drive circuit also controls the electric current to the electromagnetic coil of the pilot clutch mechanism 20e thereby to place the vehicle 10 in the four-wheel drive state suitable to the present driving status.

The control device 30 has stored therein a switching control program for selectively switching the drive mode of the vehicle 10 to the two-wheel drive mode, the automatic four-wheel drive mode or the four-wheel drive lock mode. This switching control constitutes the important part of the present invention, wherein the first switching control is a control function for inhibiting the switching operation to any commanded drive mode, the second switching control is a control function for gradually switching the switching operation to any such commanded drive mode, and the third switching control is a control function for performing both of these control functions.

In the first switching control, the control device 30 inhibits the switching to any commanded four-wheel drive mode while the vehicle 10 traveling at a low speed in the two-wheel drive mode is suffering a large slip. In this case, the control device 30 executes the switching to any such commanded four-wheel drive mode after the vehicle 10 traveling at the low speed in the two-wheel drive mode comes out of the state under such a large slip. This prevents the torque exceeding a predetermined value and abnormal sounds or noises from being generated in the drive system.

Furthermore, the control device 30 in the second switching control restrains the torque of the vehicle 10 at the time of such switching from being suddenly transmitted to the secondary driven wheels 19 so that the driving power during the traveling of the vehicle 10 can be prevented from being abruptly changed due to the instantaneous switching of the drive mode. Thus, it becomes possible to prevent the motion of the vehicle 10 during a turn from being changed abruptly. In addition, the control device 30 in the third switching control performs a control combining the first switching control and the second switching control.

The control device 30 in this particular embodiment serves as a first control device 30a storing a control program for the aforementioned first switching control, a second control device 30b storing another control program for the aforementioned second switching control and a third control device 30c storing another control program for the aforementioned third switching program which incorporates the first and second switching controls.

The four-wheel drive vehicle 10 is further provided with several indication lamps which serve as drive mode lamps for indicating respective present drive modes assigned thereto, wherein the aforementioned first to third control devices 30a through 30c have the functions for turning on the indication lamps which correspond to selected drive modes, respectively. In addition, each of the control devices 30a through 30c also has a function for winking or blinking one of the indication lamps corresponding to a commanded drive mode. Each indication lamp when blinking indicates that the drive mode which is commanded to be switched to is in curse of being switched to.

Figure 4:
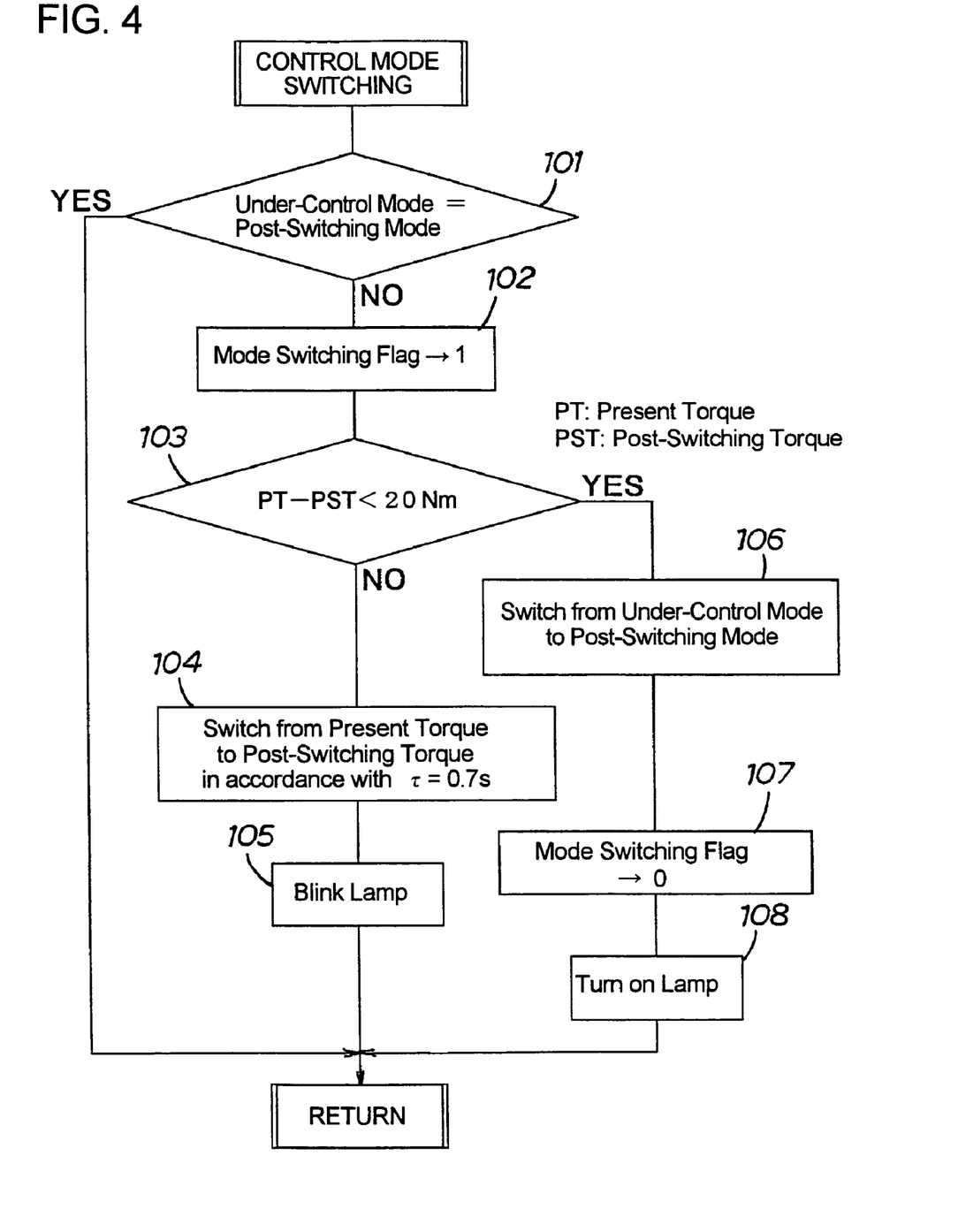
FIG. 4 is a flowchart showing a switching control program executed by the control device.
Figure 5:
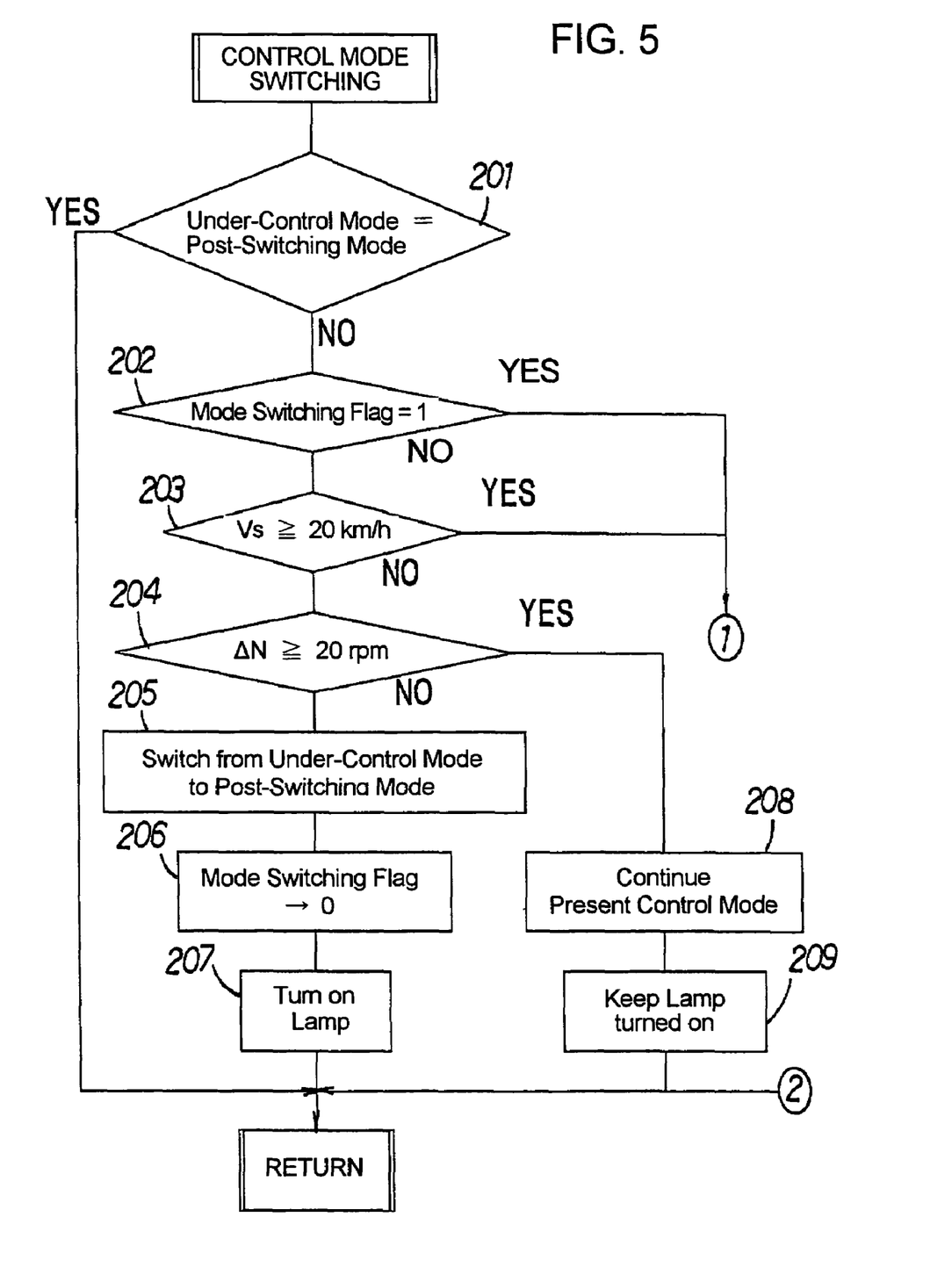
FIG. 5 is a flowchart showing another control program executed by the control device.
Figure 6:
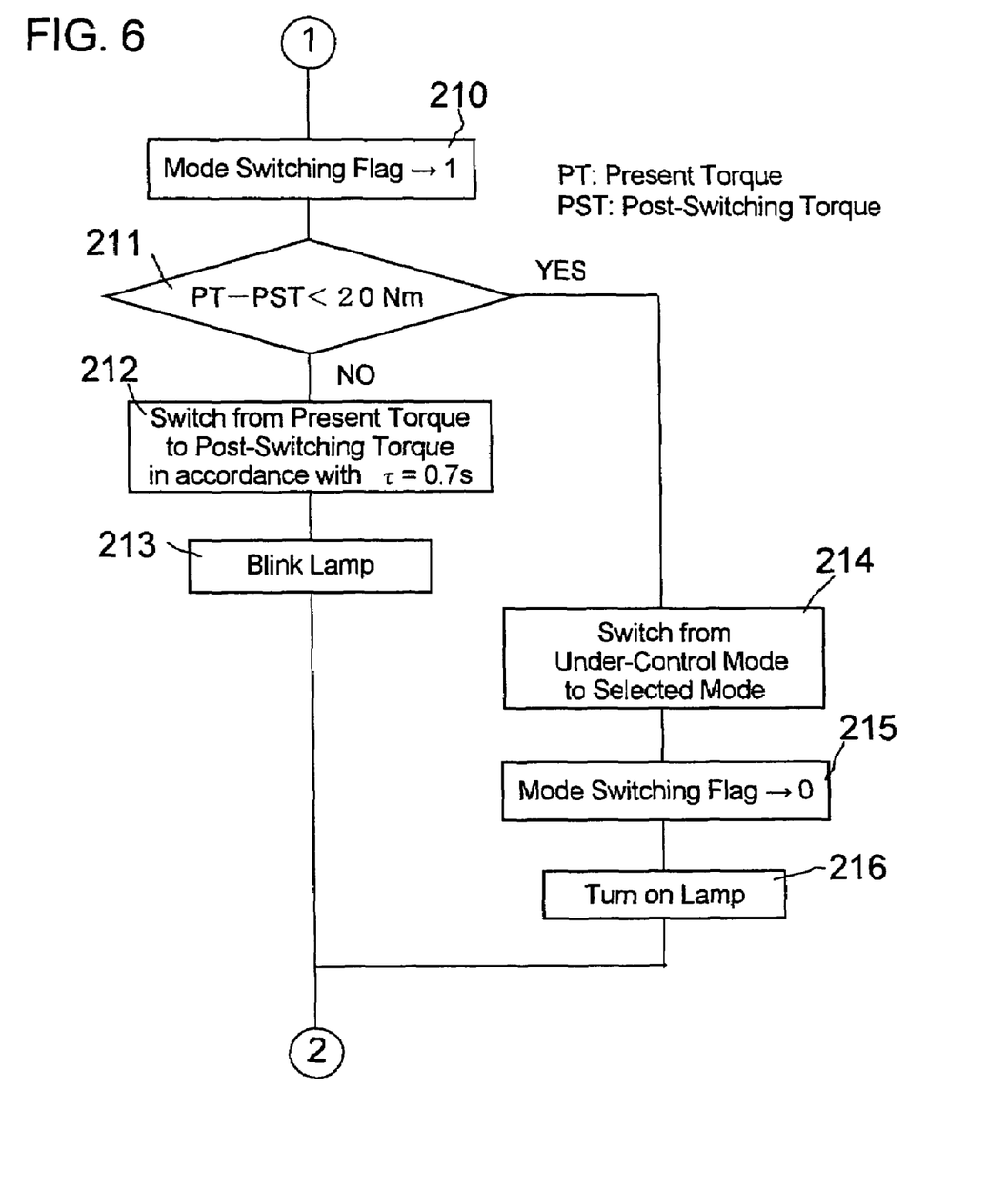
FIG. 6 is a partial flowchart constituting a part of the control program shown in FIG. 5.

FIG. 4 shows a flowchart for enabling the aforementioned second control device 30b to execute the control program stored therein, while FIGS. 5 and 6 show another flow chart for enabling the aforementioned third control device 30c to execute the control program stored therein. When the driver issues a switching command to one of the drive modes by switching the selection switch 34, the control device 30b or 30c corresponding to the selected drive mode controls the switching to the selected drive mode in response to the switching command signal.

The switching control is performed by controlling the electric current to the electromagnetic coil of the drive power transmission device 20 so that the friction engagement force (i.e., transmission torque value) of the main clutch mechanism 20c of the driving power transmission device 20 is controlled to the transmission torque value corresponding to a selected drive mode. FIG. 7(a) is a graph showing an example of the relation between the vehicle speed and the torque value in each of the drive modes. FIG. 7(b) is a graph showing the relation between the transmission torque value and the lapsed time in transition of the switching between the drive modes. FIG. 7(c) is a graph showing an example of the state that the indication lamps are switched in transition of the switching between the drive modes.

In the front-and rear wheel drive vehicle 10 incorporating the control device 30b therein, when the drive mode is switched from one to another by the driver's switching manipulation of the selection switch 34, the control device 30b executes the drive mode switching control program in accordance with the flowchart illustrated in FIG. 4 to control the drive mode switching.

The microcomputer constituting the control device 30b judges at step 101 whether or not the drive mode presently under control (under-control mode) is the same as the drive mode selected to be switched to by the selection switch 34 (post-switching mode or switch-selected mode). When the microcomputer judges that the under-control mode and the switch-selected mode are identical, the microcomputer goes back to the starting point of the switching control program without executing the subsequent steps of the switching control program. On the contrary, when the microcomputer judges that the under-control mode and the switch-selected mode are not identical, the microcomputer advances its routine to step 102. The microcomputer sets a mode switching flag to "1" at step 102 and further advances the program routine to step 103.

At step 103, the microcomputer judges the difference between the present transmission torque value (present torque) of the driving power transmission device 20 and a transmission torque value (target or post-switching torque) to be set based on, e.g., the graph shown in FIG. 7(a) in another drive mode which is now selected to be switched to. When the difference between the present torque and the target or post-switching torque is judged to be larger than a predetermined value (e.g., 20 Nm), the microcomputer advances the program routine in turn to step 104 and step 105.

Figure 7:
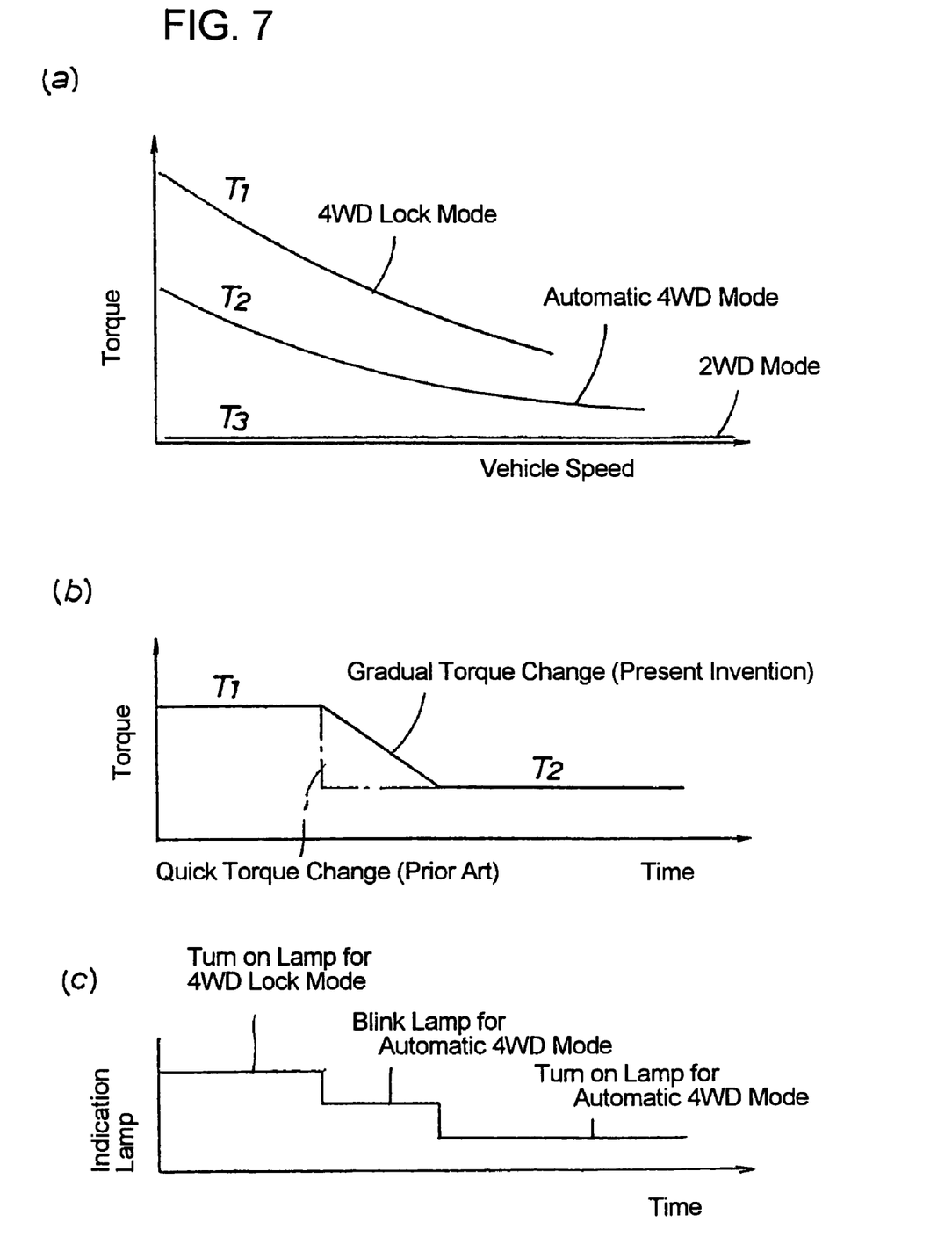
FIGS. 7(a), 7(b) and 7(c) are graphs respectively showing an example of the relation between the vehicle speed and the transmitted torque value, an example of the relation between the transmitted torque value and the lapsed time before and after the switching of the drive mode and an example of the transient state of mode indication lamps in connection with lapsed time before and after the switching of the drive mode.

At step 104, the microcomputer gradually changes the transmission torque value of the driving power transmission device 20 from the present torque to the post-switching torque along an inclination determined by a predetermined time constant ($\tau$) (e.g., 0.7 s (=0.7 seconds): the valve determining the inclination along which the torque is varied from a present value to a target value). Under this control (gradual switching control), the transmission torque value is not varied quickly or instantaneously as is done in the prior art as indicated by the dotted line in FIG. 7(*b*) but is varied gradually as indicated by the inclined solid line in FIG. 7(*b*).

At step 105, the microcomputer winks or blinks the indication lamp identifying the selected drive mode during the gradual switching control (during the course of switching) as shown, for example, in FIG. 7(*c*). Then, the microcomputer returns the processing routine to the starting point.

Further, when judging at step 103 that the difference between the present torque and the target or post-switching torque is equal to or smaller than the predetermined value (e.g., 20 Nm), the microcomputer moves the processing routine to step 106, so that the gradual switching control at step 104 is skipped to complete the switching to the post-switching mode instantaneously. Thereafter, the microcomputer clears the mode switching flag (i.e., sets the flag to "0") at step 107 and turns on the indication lamp for the selected drive mode at step 108.

As described above, according to the switching control of the drive mode by the control device 30*b*, the control function for gradually executing the switching to the selected drive mode restrains the torque generated in the vehicle 10 at the time of the switching commanded, from being transmitted instantaneously to the driven wheels 19, whereby the driving power of the vehicle traveling is prevented from being abruptly changed due to the instantaneous change of the drive mode. Accordingly, it can be realized to obviate the sudden change in the motion of the vehicle in the course of the vehicle making a turn.

In the front-and-rear drive vehicle 10 with the control device 30*c*, when the driver's switching manipulation of the selection switch 34 causes the drive mode to be switched, the control device 30*c* executes the drive mode switching control program in accordance with the flowcharts shown in FIGS. 5 and 6 and controls the switching to the selected drive mode.

At step 201, the microcomputer constituting the control device 30*c* judges whether or not the drive mode presently under control (under-control mode) is the same as the selected mode (post-switching mode) which is commanded to be switched to by the selection switch 34. When judging that the under-control mode is the same as the post-switching mode, the microcomputer returns the program routine to the starting point without executing those steps followed.

Further, when judging at step 201 that the under-control mode is not the same as the post-switching mode, the microcomputer further proceeds to step 202 in the switching control program and judges the status of the mode switching flag. When judging at step 202 that the mode switching flag has not been set to "1", the microcomputer moves the processing routine to step 203 through step 209. If the flag is found to have been set to "1" at step 202, on the other hand, the microcomputer proceeds to step 210 through step 216 shown in FIG. 6. Steps 210 through 216 correspond to the gradual switching control and the instantaneous mode switching control executed in accordance with the switch control program (i.e., steps 103 through 108) shown in FIG. 4. Therefore, a gradual mode switching control at step 212 or an instantaneous mode switching control at step 214 is performed in dependence on the result of judgment at step 211 in the same way as that executed at step 104 or step 106 in FIG. 4.

At step 203, the microcomputer compares the vehicle speed with the predetermined value (e.g., 20 km/h). When the vehicle speed is found to be equal to or higher than the predetermined value, the microcomputer advances the program routing to step 210 to execute the aforementioned switching control program. On the other hand, when the vehicle speed is found to be slower than the predetermined value, the microcomputer advances the program routine to step 204.

At step 204, the microcomputer compares the rotational difference ($\Delta N$) between the front and rear wheels 15, 19 with a predetermined value (e.g., 20 rpm). When the rotational difference ($\Delta N$) is found to be equal to or larger than the predetermined value, the microcomputer proceeds to step 208 and step 209. The microcomputer continues the under-control mode at step 208 and keeps the lamp, identifying the under-control drive mode, turned on at step 209. When the vehicle 10 is in this drive state with the large rotational speed difference ($\Delta N$), the microcomputer returns the program routine to the starting point, so that the execution of the switching control can be delayed until the vehicle 10 comes out from the state of the large rotational speed difference ($\Delta N$), as referred to the next. Thus, the step 208 serves to inhibit the drive mode of the vehicle 10 from being switched to the commanded drive mode instantaneously.

That is, when judging at step 204 that the rotational difference ($\Delta N$) is less than the predetermined value (e.g., 20 rpm), the microcomputer proceeds to step 205 through step 207. The microcomputer completes the switching from the under-control mode to the post-switching mode quickly or instantaneously at step 205, clears the mode switching flag at step 206 and turns on the indication lamp corresponding to the selected drive mode at step 207.

As described above, according to the switching control of the drive mode by the control device 30*c*, the control function for disabling the transition to a commanded drive mode disables the instantaneous transition to the commanded four-wheel drive mode when the vehicle traveling at a low speed in the two-wheel drive mode is making a large slip, for example. Then, the control device 30*c* puts the vehicle 10 in the four-wheel drive mode after the vehicle traveling at the low speed in the two-wheel drive mode comes out from the above large slip status. This construction prevents the torque from being generated beyond a tolerable or allowable maximum value and abnormal sounds or noises from be made from the driving power transmission path.

As described above, according to the switching control of the drive mode by the control device 30*b*, the control function for gradually making the transition to the commanded drive mode prevents the torque generated in the vehicle 10 from being transmitted instantaneously thereby to avoid the sudden change in the driving power caused by the instantaneous change of the drive mode during the traveling of the vehicle. Thus, in addition to the foregoing functions and advantages, it can also be realized to prevent the vehicle from suddenly changing the motion thereof while making a turn, for example.

Obviously, numerous modifications and variations of the present invention are possible in light of the above teachings. It is therefore to be understood that within the scope of the appended claims, the present invention may be practiced otherwise than as specifically described herein.

What is claimed is:

1. A control device for a front-and-rear wheel drive vehicle for electrically controlling a driving power transmission device which is arranged on a driving power transmission path of said vehicle for transmitting the drive power from a power source to driven wheels as either of front wheels and rear wheels of said vehicle, said control device including:

switching control means for electrically controlling said driving power transmission device to switch the drive mode of said vehicle selectively from a two-wheel drive mode to a four-wheel drive mode;

means for determining a difference between a present torque which said driving power transmission device is transmitting and a target torque which said driving power transmission device is to transmit after the switching of said drive mode from a two-wheel drive mode to a four-wheel drive mode; and gradual switching control means responsive to said difference determining means for electrically controlling said driving power transmission device to gradually change the present torque to the target torque only when the difference between said present and target torques is more than a predetermined value at the time of the switching of said drive mode from a two-wheel drive mode to a four-wheel drive mode.

2. The control device for a front-and-rear wheel drive vehicle as set forth in claim 1, wherein said gradual switching control means gradually changes said present torque to said target torque when the difference between said present and target torques is more than said predetermined value at the time of the switching of said drive mode and when the traveling speed of said vehicle is equal to or more than a predetermined medium speed.

3. The control device for a front-and-rear wheel drive vehicle as set forth in claim 1, further including:

lamp control means for selectively turning on or off a drive mode lamp which is provided on the vehicle to indicate the drive mode of said vehicle being presently selected, said lamp control means being operable to blink said drive mode lamp while said gradual switching control means gradually changes said present torque to said target torque.

4. A control device for a front-and-rear drive wheel vehicle for electrically controlling a driving power transmission device which is arranged on a driving power transmission path of said vehicle for transmitting the drive power from a power source to driven wheels as either of front wheels and rear wheels of said vehicle, said control device including:

switching control means for electrically controlling said driving power transmission device to switch the drive mode of said vehicle selectively from a two-wheel drive mode to a four-wheel drive mode;

switching inhibiting means for inhibiting the drive mode of said vehicle from being switched from a two-wheel drive mode to a four wheel drive mode when said vehicle is traveling at a lower speed than a predetermined value and when the rotational speed difference between front and rear wheels is larger than a predetermined difference;

means for determining a difference between a present torque which said driving power transmission device is transmitting and a target torque which said driving power transmission device is to transmit after the switching of said drive mode from a two-wheel drive mode to a four wheel drive mode; and gradual switching control means responsive to said difference determining means for electrically controlling said driving power transmission device to gradually change the present torque to the target torque only when the difference between said present and target torques is more than a predetermined value at the time of the switching of said drive mode from a two-wheel drive mode to a four-wheel drive mode.

5. The control device for a front-and-rear wheel drive vehicle as set forth in claim 4, wherein said gradual switching control means gradually changes said present torque to said target torque when the difference between said present and target torques is more than said predetermined value at the time of the switching of said drive mode and when the traveling speed of said vehicle is equal to or more than a predetermined medium speed.

6. The control device for a front-and-rear wheel drive vehicle as set forth in claim 4, further including:

lamp control means for selectively turning on or off a drive mode lamp which is provided on the vehicle to indicate the drive mode of said vehicle being presently selected, said lamp control means being operable to blink said drive mode lamp while said gradual switching control means gradually changes said present torque to said target torque.

* * * * *